United States Patent [19]

Sterlacci

[11] Patent Number: 5,567,080

[45] Date of Patent: Oct. 22, 1996

[54] TRAY TABLE WITH DETENT CONTROL FOR INVALID CHAIRS AND METHODS OF OPERATING AND MAKING SUCH TRAY TABLES

[76] Inventor: George Sterlacci, 1388 Ocean Ave., Bohemia, N.Y. 11716

[21] Appl. No.: 157,969

[22] Filed: Nov. 24, 1993

[51] Int. Cl.[6] .............................. A47B 83/02; F16B 7/10
[52] U.S. Cl. .......................... 403/322; 297/151; 403/109; 403/319; 403/377
[58] Field of Search ............................. 403/83, 104, 109, 403/319, 322, 324, 325, 377, 378; 297/149, 151, 153

[56] References Cited

U.S. PATENT DOCUMENTS

| | | | |
|---|---|---|---|
| 604,896 | 5/1898 | Garnett | 403/325 X |
| 760,473 | 5/1904 | Nichols | 403/324 |
| 954,671 | 4/1910 | Danker | 403/324 |
| 1,428,916 | 9/1922 | Snideman | 297/153 |
| 2,243,190 | 5/1941 | Capaldo | 403/109 X |
| 2,342,043 | 2/1944 | Feldman | 297/153 |
| 2,790,484 | 4/1957 | Pollack | 297/153 |
| 2,793,869 | 5/1957 | Braun | 403/83 X |
| 2,937,694 | 5/1960 | Willson et al. | 297/153 |
| 3,490,808 | 1/1970 | Siegel | 297/153 |
| 3,575,466 | 4/1971 | Thomas et al. | 297/155 |
| 3,604,734 | 9/1971 | Friedman | 403/104 |
| 3,632,163 | 1/1972 | Burnham | 297/153 X |
| 3,761,129 | 9/1973 | Schultz | 297/423.33 |
| 4,081,198 | 3/1978 | Penney | 297/153 |
| 4,221,430 | 9/1980 | Frobose | 403/324 X |
| 4,433,934 | 2/1984 | Cleveland | 403/318 |
| 4,632,451 | 12/1986 | Lee | 297/153 |
| 4,679,756 | 7/1987 | Wood | 248/285 |
| 4,685,726 | 8/1987 | Wolpert, Jr. | 297/150 |
| 4,770,559 | 9/1988 | Yoo | 403/324 X |
| 4,834,413 | 5/1989 | Patel et al. | 280/304.1 |

Primary Examiner—Blair Johnson
Assistant Examiner—Andrea Chop

[57] ABSTRACT

The present invention relates to a tray table for invalid chairs operable in two modes, and methods for making and operating the tray table. Runners on the tray slide into brackets mounted to the arms of the chair, thus maintaining the tray in position in front of the patient. A detent mounted to at least one bracket is capable of engaging a hole on at least one runner. In one mode, the detent engages the hole in the tray table, locking the tray table in position on the chair. In a second mode, a sliding block is displaced under the knob of the detent. The detent is thereby maintained in a retained condition such that the runner may freely slide in and out of the bracket.

30 Claims, 3 Drawing Sheets

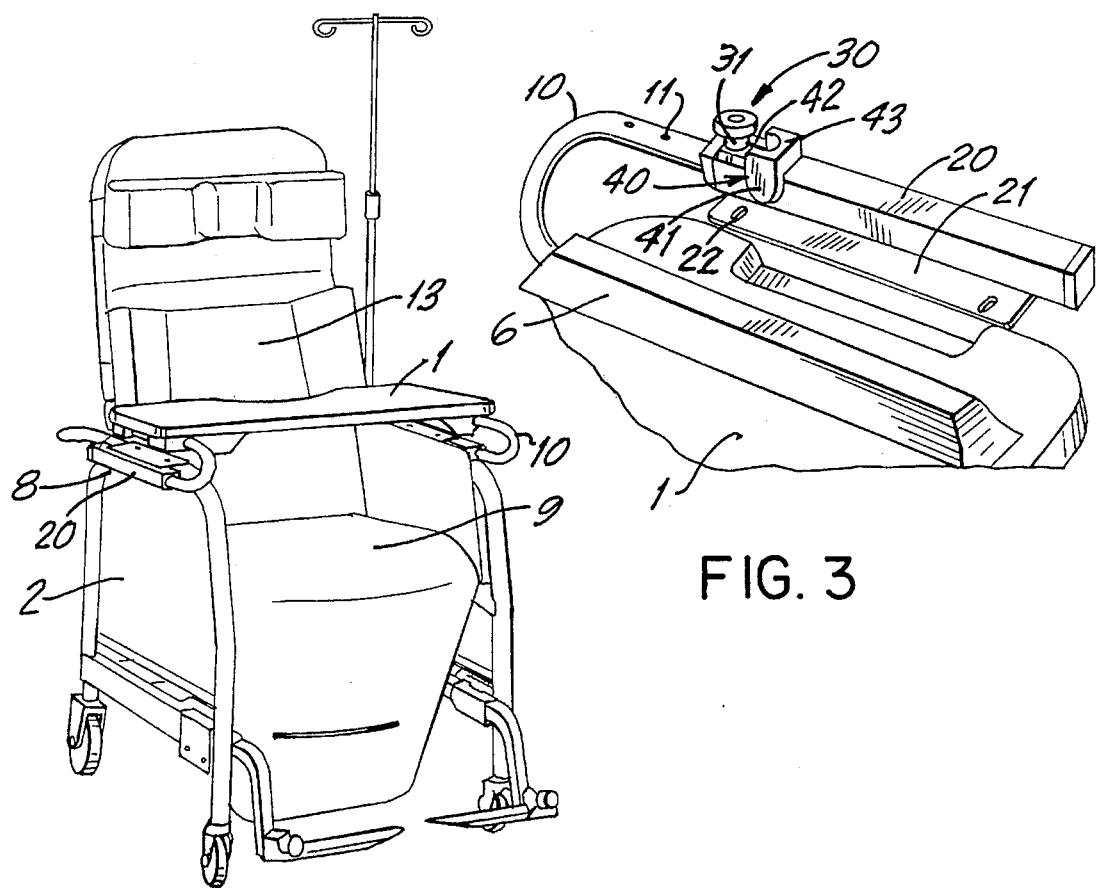
FIG. 3
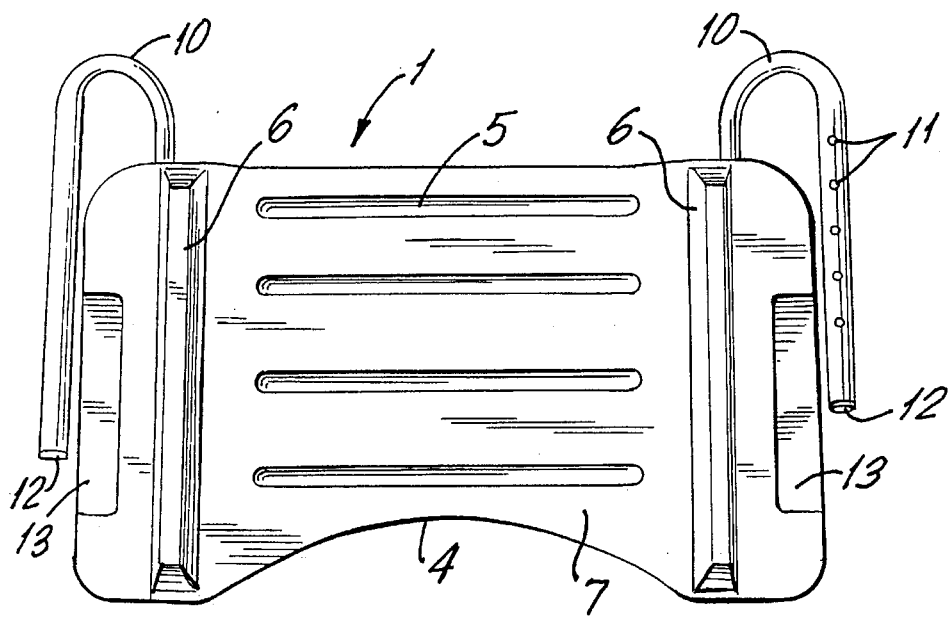
FIG. 1
FIG. 2

TRAY TABLE WITH DETENT CONTROL FOR INVALID CHAIRS AND METHODS OF OPERATING AND MAKING SUCH TRAY TABLES

FIELD OF THE INVENTION

The present invention relates to the field of life quality management for the elderly or infirm, particularly, to a tray table capable of selectively engaging brackets on an invalid or geriatric chair and methods of operating and making such tray tables.

BACKGROUND OF THE INVENTION

Patients, such as the elderly or infirm, are often required to spend long periods of time in a chair, such as a reclining chair or a wheelchair. Because these patients are less mobile, they may not be able to easily sit at a table in a standard chair. Consequently, the patients must perform all tasks, such as eating or reading a book, on their lap.

Tray tables have been developed that attach directly to invalid chairs. Some such tables have runners that can be inserted into cavities in brackets that are fixedly mounted to the arms of the chair. These tables are useful because they permit easy mounting of a tray table to a chair. Further, the patient can remove the tray himself by merely pushing the tray forward. However, because the tray tables are not fixed, the runners can slip out of the brackets accidentally such that the tray table falls onto the patient, or completely off of the chair onto the floor.

Tray tables have also been developed that lock the runners to the brackets. Typical locking devices include detents on the brackets that engage holes in the runners. The locking devices are not always accessible to the patient and are often too stiff for a patient to disengage. Consequently, patients become imprisoned in the chairs behind locked tray tables.

It is therefore an object of the present invention to provide a tray table for an invalid chair which can be operated in a locking mode where a locking mechanism engages the runners of the tray or in a sliding mode, where locking mechanism does not engage the runners of the tray.

It is another object of the present invention to provide a caregiver a means for Selecting the operating mode of a detent. In a locking mode, the selecting means allows a detent mounted on a bracket to engage a runner attached to a tray table, thus locking the tray table in position. In a sliding mode, the selecting means prevents the detent from engaging the runner. Thus, the runners of the tray table are free to slide in the brackets.

It is also an object of the present invention to provide a method of operating a tray table such that the table can be used in a sliding mode where a locking mechanism does not engage the runners of the tray and the table can be used in a locking mode where the locking mechanism does engage the runners of the tray.

It is also an object of the present invention to provide a method of making a retainer, such as a bracket, for a tray table capable of operating in a sliding mode and a locking mode.

These and other objects of the present invention will be clear from the following description of the invention.

SUMMARY OF THE INVENTION

One aspect of the present invention relates to a method of operating a tray table for an invalid chair. Runners on the tray table are inserted into cavities in brackets. The brackets are mounted to a chair. A detent mounted on the bracket engages a hole in the runner. The detent is retracted such that it disengages the hole. A sliding block is moved between the detent and the bracket, maintaining the detent in the retracted position.

In accord with another aspect of the present invention, a sliding block is provided for use with a detent on a tray table. The block has an upper ledge and a lower ledge disposed adjacent to each other. There is a means for slidably mounting the block to a detent such that, in a first position, the upper ledge is disposed adjacent to the detent and, in a second position, the lower ledge is disposed adjacent to the detent.

In accord with yet another aspect of the present invention, a method of making a retainer for use with a tray table is provided. A detent is mounted onto a bracket such that the detent pin protrudes into a cavity in the bracket. A sliding block, having an upper ledge and a lower ledge, is mounted to the bracket such that the detent is positioned in a track on the block. A knob is mounted to the detent. The block is capable of sliding from a first position where the lower ledge is positioned between the knob and the bracket, to a second position where the upper ledge is positioned between the knob and the bracket.

BRIEF DESCRIPTION OF THE DRAWINGS

FIG. 1 is a perspective view of an embodiment of a tray table of the present invention capable of selectively operating in a sliding mode and a locking mode, shown mounted on a chair;

FIG. 2 is a bottom view in isolation of the tray table of FIG. 1;

FIG. 3 is a partial perspective view of the tray table of FIG. 1 engaged with a bracket;

DETAILED DESCRIPTION OF THE DRAWINGS

Figure 4:
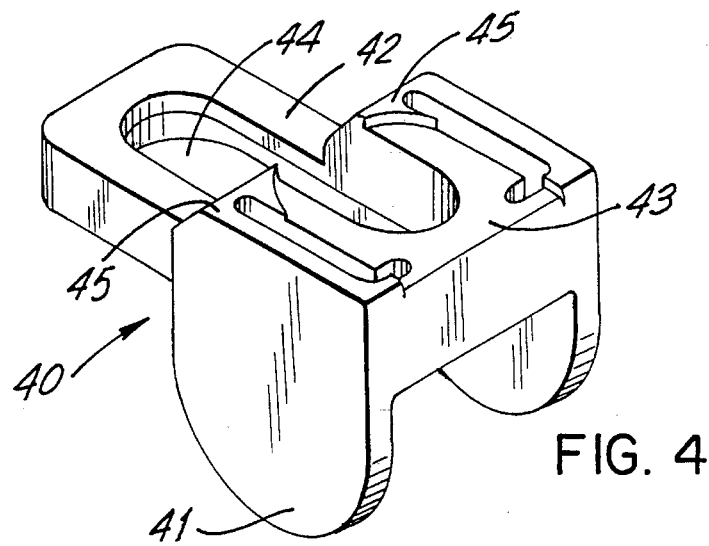
FIG. 4 is a perspective view of a sliding block of a selecting means of the tray table of FIG. 1 in isolation.

FIG. 1 is a perspective view of a tray table 1 of the present invention mounted on a chair 2, such as a reclining chair for an invalid having a seat 9 and a back 70. One acceptable chair is the PREFERRED CARE® recliner marketed by Lumex, Inc. of Bay Shore, N.Y., assignee of the present invention. While shown on a reclining chair, the present invention could be used on any sort of chair, particularly, chairs for the elderly or infirm, such as wheelchairs or geriatric chairs. Arms 8 are positioned at the sides of the chair 2. As described more fully below, brackets 20, preferably made of steel, are mounted to the underside of the arms 8 for retaining the tray table in position. When mounted, the tray table 1 is located between the arms 8 and in front of a patient sitting in the chair 2. As described more fully below, the position of the tray table 1 is adjustable towards and away from the patient to a position comfortable for the patient.

FIG. 2 is a bottom view of the tray table 1 dismounted from the chair 2. The tray table 1 comprises a tray 15 and a means for supporting the tray, such as runners 10. Runners 10 are mounted to the front 14 of the tray 15, bending around and extending beneath the tray. Runners 10 are depicted as rods, preferably made of steel, however other types of supporting means or different types of runners would suffice to practice the invention. Since the runners 10 are mounted to the front 14 of the tray 15, a caregiver, such as a nurse, can easily grip the runners to mount and dismount the tray 15 from the chair 2. Preferably, the runners 10 are rotatably mounted to the tray 15 such that they can be rotated against the bottom tray, reducing the size of the tray table 1 for storage.

Detent holes 11 are disposed along at least one of the runners 10. As discussed more fully below, the holes 11 cooperate with a detent 30 mounted to the bracket 20 to lock the tray table 1 in position on the chair 2. Various detent holes 11 are provided to permit adjustment of the position of the tray table 1 nearer to and further from the patient.

Handles 13 on the tray 15 are formed by indenting a portion of the tray along its sides, thus permitting the tray to be easily gripped by the caregiver. A cut-out 4 is located at the rear of the tray 15 to allow additional room for the patient's torso. The bottom of the tray 15 is indented to form ribs 5 that increase the tray's stability. Preferably, the ribs 5 are formed such that they are connected to the top of the tray 15. Ridges 6 are positioned on the underside of the tray 15. The ridges 6 are sized to fit snugly between the arm rests 8 of the chair 2 (see FIG. 1), thus adding further stability to the tray. A center portion 7 of the tray table 1 is curved concave down to add room for the patient's legs, particularly when the patient is in a reclined position. The tray 15 is preferably made of polyethylene or another hard plastic material.

FIG. 3 is a perspective view of the tray table 1 of the present invention engaged to a retaining means, such as a bracket 20, by a means 50 for selecting the mode of operation of the tray table 1, i.e., a sliding mode or a locking mode. A flange 21 is mounted to the bracket 20 such as by spot welding. Mounting holes 22 are disposed in the flange 21 to permit easy mounting of the bracket 20 to the arm rest 8. Typically, the bracket 20 is attached to the top of the arm rest 8 of the chair 2.

The selecting means 50 comprises a detent 30 and a sliding block 40. The detent 30 with a knob 31 is mounted near the front of the bracket 20 by being welded to the bracket, or in any other appropriate manner. The sliding block 40 is slidingly mounted on the detent 30 between the knob 31 and the bracket 20. The sliding block 40 is capable of sliding along the bracket 20 from a rearward, sliding position where the tray table 1 can slide out of the brackets to a forward, locking position where the tray table is locked to the bracket. Thus, the detent 30 and sliding block 40 cooperate to permit the caregiver to select the mode of operation of the tray table 1. As shown in FIG. 3, the sliding block is in the "locked" position such that the detent 30 is free to operate in a traditional manner, engaging the detent holes 11 along the runner 10.

FIG. 4 is a perspective view of the sliding block 40 shown in isolation. Preferably, the block 40 is cast as a single piece of polyethylene or other plastic. However, the block 40 can also be of multiple piece construction and still practice the invention. The sliding block 40 has a lower ledge 42 and an upper ledge 43. A channel 44 extends along the length of the sliding block 40 from the lower ledge 42 to the upper ledge 43, forming a track 46. The detent 30 is disposed in the track 46.

Wings 41 are mounted to the sliding block 40 at its sides. When the sliding block 40 is mounted on the bracket 20, the wings 41 straddle the bracket 40 to direct the movement of the sliding block along the bracket (see FIG. 3).

A raised lip 45 extends around the upper ledge 43. When the knob 31 is in the sliding mode (that is, the knob is positioned on upper ledge 43 as in FIG. 6), the lip 45 prevents the knob from slipping into the locked position (that is, slipping onto lower ledge 42). Preferably the lip 45 is curved to match the profile of the knob 31. As shown in the drawings, the lower ledge 42 is positioned forward of the upper ledge 43. Alternatively, the upper ledge could be positioned forward of the lower ledge and still practice the invention.

Figure 5:
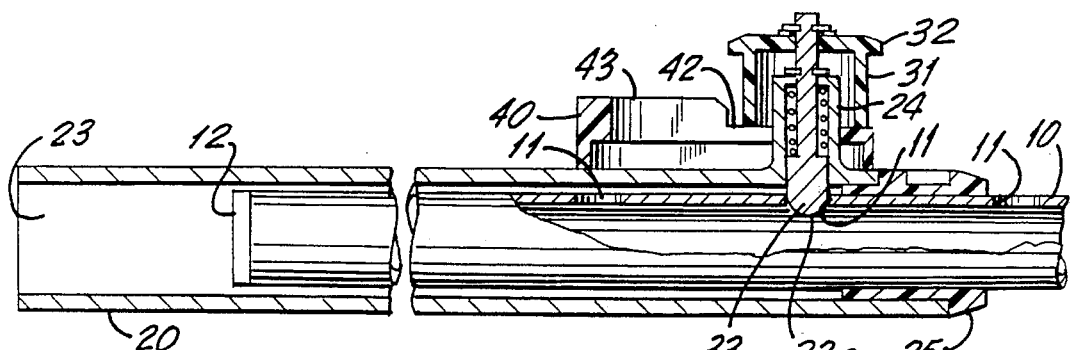
FIG. 5 is a cut-away view of the selection means of the tray table of FIG. 1 in the locking position.

FIG. 5 is a cut-away view of the runner 10 positioned within the cavity 23 of the bracket 20. The sliding block 40 is shown in the locking position such that the knob 31 is positioned above the lower ledge 42. A polyethylene or plastic casing 25 is positioned in the bracket 20 to protect the bracket from the runner 10. A polyethylene or plastic plug 12 is inserted at the end of the runner 10 to prevent it from damaging the bracket 20. Preferably, a disk 32 is attached to the knob 31 or formed integrally with the knob so that the knob may be more easily gripped and retracted. A detent pin 33 is biased by a spring 34 towards the bracket 20 and the runner 10. A sleeve 24 is attached to the bracket 20, such as by welding or brazing, retaining the spring 34 in position about the pin 33. The sleeve 24 is positioned in the track 46 of the block 40. When the detent pin 33 is disposed above a detent hole 11, the tip 33a of the detent pin is free to protrude into the detent hole. Consequently, the runner 10 is prevented from sliding out of the cavity 23.

Figure 6:
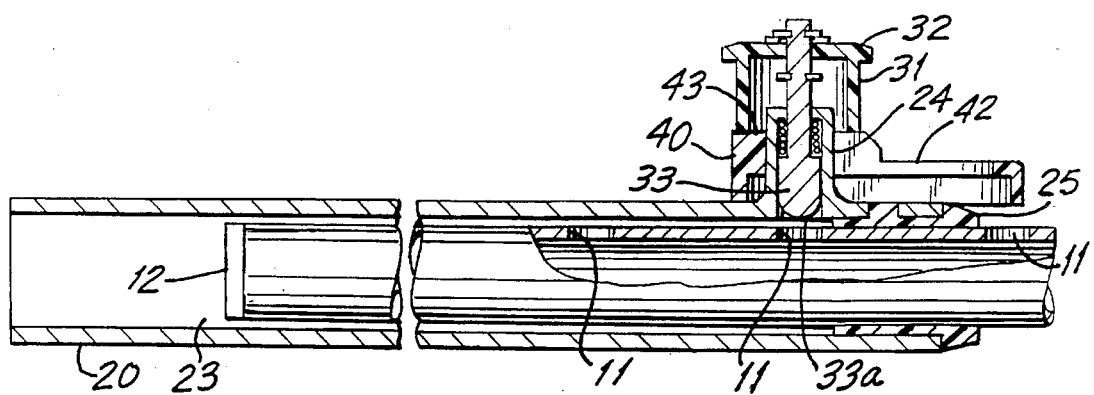
FIG. 6 is a cut-away view of the selection means of the tray table of FIG. 1 in the sliding position.

FIG. 6 shows the sliding block 40 in the sliding mode. The knob 31 is positioned on the upper ledge 43 of the sliding block 40. Consequently, the pin 33 is maintained in a position retracted from the cavity 23, disengaging the holes 11 in the runners 10, thus allowing the runner 10 to slide freely in and out of the cavity 23 of the bracket 20.

Figure 7:
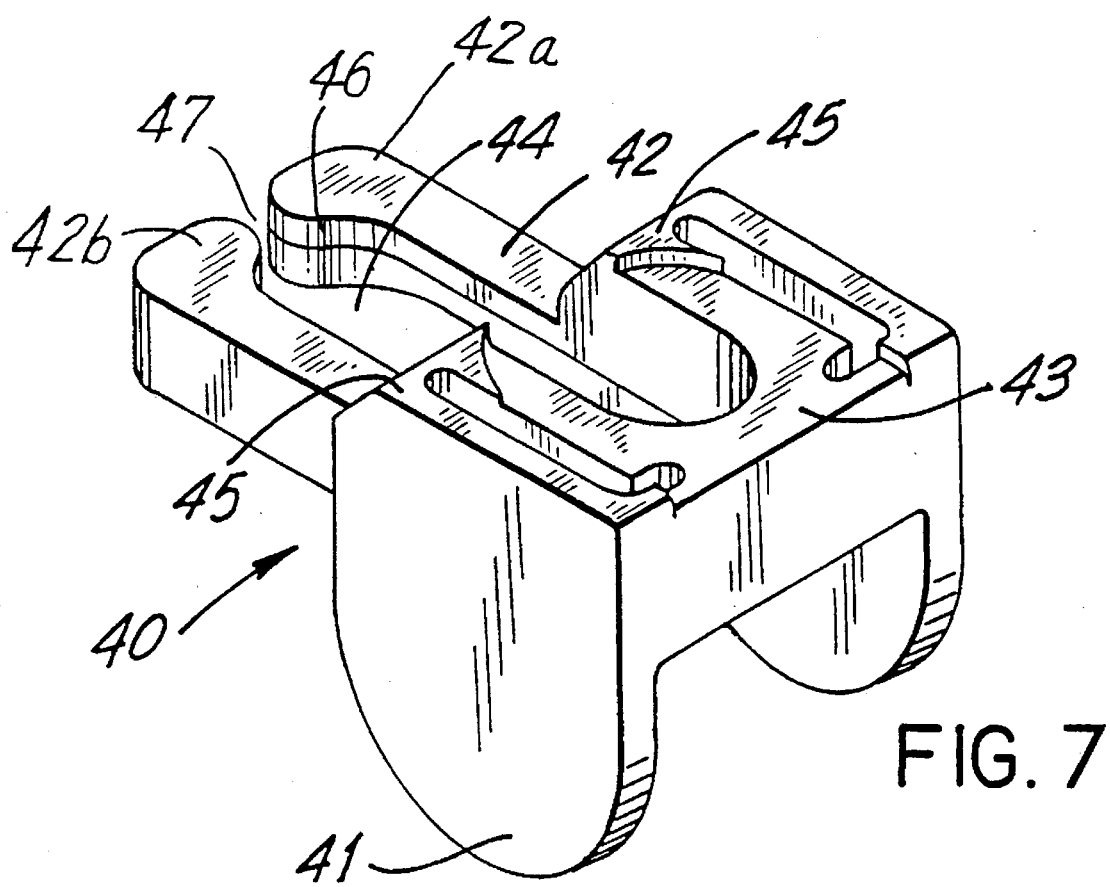
FIG. 7 is a perspective view of the sliding block of the selecting means with a slit.

FIG. 7 is a perspective view of another embodiment of the sliding block 40 which permits retrofitting of existing tray tables. A slit 47 is located in the block 40 leading to the channel 44 such that the lower ledge 42 is divided into lower ledge arms 42a and 42b. The sleeve 24 of the bracket 20 can be pushed through the slit 47 into the channel 44. The lower ledge arms 42a and 42b deform to permit the sleeve 24 through the slit 47 and into the chanel 44. The lower ledge arms 42a and 42b then return to their original shape, retaining the sleeve in the track 46.

To make the tray table of the present invention, the detent 30 is mounted to the bracket 20. The channel 44 of the sliding block 40 is positioned about the detent 30. Consequently, the block 40 can slide from a first position to a second position while the detent 30 rides in the track 46. The knob 31 is then attached to the detents 30. The knob 31 has a larger cross section than the channel 44, thus preventing the block 40 from falling off of the detent. Alternatively, the knob 31 on an existing bracket 20 can be retracted thus exposing the sleeve 24. The sleeve 24 is then forced through the slit 47, deforming the lower ledge arms 42a and 42b, and into the channel 44.

To operate the tray table 1 of the present invention, the brackets 20 are first mounted to the underside of the arm rests 8 via flange 21. A bracket 20 should be provided for each runner 10. However, a detent 30 and sliding block 40 need only be provided on one bracket. The knob 31 is retracted while the sliding block 40 is displaced forward in the sliding position. The runners 10 are inserted into the cavities 23 until they are at a position comfortable for the patient.

The caregiver is then free to chose whether the tray table is operated in the sliding mode or the locking mode. To put the sliding block 40 in the sliding position, the knob 31 is retracted such that the detent pin 33 is pulled from engagement with the detent hole 11. While the knob 31 is retracted, the sliding block 40 is moved forward (to the right in FIGS. 5–6). The track 46 and the wings 41 direct the sliding motion of sliding block 40 such that it moves parallel with the bracket 20 and the upper ledge 43 is moved between the knob 31 and the bracket. The knob 31 is retracted sufficiently so that it can pass over lip 45. The upper ledge 43 prevents the knob 31 from succumbing to the bias of the spring 34 and moving toward the bracket 20. The pin 33 is thus prevented from engaging the detent holes 11 on the runner 10 and the runner is free to slide in and out of the cavity 23. Friction between the runners 10 and the brackets 20 is sufficient to prevent the runners 10 from slipping out of the bracket 20.

To put the tray table 1 in the locking mode, the knob 31 is retracted over lip 45. The sliding block 40 is then moved rearwardly (to the left in FIGS. 5–6) until the lower ledge 42 is located beneath the knob 31. Consequently, the detent pin 33 is free to succumb to the bias of spring 34. The runner 10 is moved within the cavity 23 until a detent hole 11 is adjacent to the pin 33. The pin 33 then extends into the detent hole 11, locking the runner 11 in position with respect to the bracket 20.

The foregoing description of an embodiment of the invention is not intended to be a limitation on the invention, which is defined by the following claims.

I claim:

1. A tray table for a chair comprising:

a tray;

at least one runner mounted to the tray wherein holes are disposed in the runner;

a bracket capable of mounting to a chair, the bracket having a cavity in which the runner is positioned;

a detent mounted to the bracket which selectively engages the holes of the runner; and a block having an upper ledge and a lower ledge slidingly mounted to the detent wherein the lower ledge and the upper ledge can be selectively positioned between the detent and the bracket.

2. The tray table of claim 1 wherein the tray has a cut out.

3. The tray table of claim 1 wherein the at least one runner is a rod rotatably mounted to the tray.

4. The tray table of claim 1 further comprising a mounting flange mounted to the bracket.

5. The tray table of claim 1 wherein the detent further comprises a pin which selectively engages the holes of the at least one runner and a knob attached to the pin such that retracting the knob causes the pin to disengage the holes of the runner.

6. The tray table of claim 1 wherein a channel is disposed in the block and the detent is disposed in the channel.

7. The tray table of claim 6 wherein a slit is disposed in the block connected to the channel.

8. The tray table of claim 1 wherein the block further comprises a lip disposed on the upper ledge.

9. A sliding block for control of a detent on a tray table comprising:

an upwardly facing upper ledge said upper ledge having a recess, said recess having vertical arcuate surfaces for engaging a portion of said detent and horizontal bottom surfaces;

an upwardly facing lower ledge disposed laterally adjacent to and offset below the upper ledge; and a track disposed in the block extending from the upper ledge to the lower ledge for slidably mounting the block to the detent such that the block can be translated from a first position wherein the upper ledge is disposed adjacent to the detent to a second position wherein the lower ledge is disposed adjacent to the detent;

wherein the track has straight interior sides extending from the upper ledge to the lower ledge.

10. The sliding block of claim 9 wherein a slit is disposed in the lower ledge connected to the track.

11. A tray table for an invalid chair comprising:

a tray;

means for supporting the tray mounted to the tray;

means for retaining the supporting means in position with respect to the chair;

said retaining means comprising a knob for actuating said retaining means and a pin for engaging said supporting means;

means operably engaged to the retaining means for selecting the mode of operation of the retaining means, wherein the retaining means may be operated in a locking mode in which the supporting means is maintained in fixed relationship with the retaining means, or a sliding mode in which the supporting means is free to translate with respect to the retaining means, wherein the mode selection means is slidably displaced between the knob of said retaining means and the supporting means.

12. The tray table of claims 11 wherein the retaining means comprises a bracket configured to be fixedly mounted to an invalid chair wherein a cavity is disposed in the bracket.

13. The tray table of claim 11 wherein the supporting means comprises a runner.

14. The tray table of claim 13 wherein the runner is rotatably mounted to the tray.

15. The tray table of claim 13 wherein at least one hole is disposed in the runner.

16. The tray table of claim 11 wherein the retaining means comprises a detent.

17. The tray table of claim 16 wherein the selecting means comprises a sliding block mounted on the detent.

18. The tray table of claim 17 wherein the sliding block has an upper ledge and lower ledge.

19. The tray table of claim 18 wherein a slit is disposed in the lower ledge of the sliding block.

20. The tray table of claim 17 further comprising a track disposed on the block wherein the detent is disposed in the track.

21. A method for operating a tray table for an invalid chair comprising:

inserting at least one runner on a tray into a cavity in a bracket, the bracket being fixedly mounted to the chair;

engaging a detent on the bracket to a hole in the runner;

retracting the detent such that the detent disengages the hole and displacing a sliding block between the detent and the bracket such that the detent is maintained in a retracted position.

22. The method of claim 21 wherein the step of displacing the sliding block comprises positioning an upper ledge of the sliding block between a knob on the detent and the bracket.

23. The method of claim 21 further comprising retracting the detent and displacing the sliding block from between the detent and the bracket.

24. A bracket for a tray table with runners, the bracket comprising:

a body portion;

a detent mounted to the body portion, the detent comprising:

a pin slidingly mounted to the bracket;

a knob mounted to the pin;

wherein the pin is spring-biased such that at least a portion of the pin extends into a cavity disposed in the bracket;

a sliding block disposed between the knob and the body portion, the sliding block having a lower ledge and an upper ledge wherein the sliding block can translate from a first position such that the upper ledge is between the knob and the body portion to a second position such that the lower ledge is between the knob and the body portion.

25. The bracket of claim 24 further comprising a lip disposed on the upper ledge of the sliding block.

26. The bracket of claim 24 wherein a channel is disposed in the sliding block and the pin is disposed in the channel.

27. The bracket of claim 24 wherein a disk is mounted to the knob.

28. A chair for an invalid comprising:

a reclining chair;

at least one arm mounted to the chair;

at least one bracket mounted to the arm wherein a cavity is disposed in the bracket;

a detent having a detent pin where the detent is mounted to the bracket such that the pin is capable of protruding into the cavity;

a sliding block having an upper ledge and a lower ledge slidingly mounted to the detent such that it is capable of moving from a first position to a second position;

wherein, in the first position, the detent pin is capable of protruding into the cavity; and wherein, in the second position, the detent pin is retracted from the cavity.

29. The chair of claim 28 further comprising at least a second arm mounted to the chair and at least a second bracket mounted to the second arm.

30. The chair of claim 28 further comprising a second detent mounted to the second bracket such that the second detent is capable of protruding into a second cavity and a second sliding block having an upper ledge and a lower ledge slidingly mounted to the second detent such that it is capable of moving from a first position to a second position;

wherein, in the first position, the second detent is capable of protruding into the second cavity; and wherein, in the second position, the second detent is retracted from the second cavity.

* * * * *